INVENTOR.
James I. Bunch
BY E. W. Christen
ATTORNEY

CALL SIGNAL ENCODING TRANSMITTER

Filed March 24, 1958

INVENTOR.
James I. Bunch
BY
E. W. Christen
ATTORNEY

Nov. 6, 1962 J. I. BUNCH 3,063,045

CALL SIGNAL ENCODING TRANSMITTER

Filed March 24, 1958 3 Sheets-Sheet 3

INVENTOR.
James I. Bunch
BY E. W. Christen
ATTORNEY 3,063,045

CALL SIGNAL ENCODING TRANSMITTER

James I. Bunch, Flint, Mich., assignor to General Motors Corporation, Detroit, Mich., a corporation of Delaware Filed Mar. 24, 1958, Ser. No. 723,555
4 Claims. (Cl. 340—351)

This invention relates to signaling systems and more particularly to call signal encoding transmitters.

Selective paging systems are commonly used in industrial organizations and the like where selected persons must be immediately available. Such persons are provided with a portable receiver and the receipt of a call signal informs the person that he is to make contact, as by telephone or otherwise, with a designated base station for further communication. In such systems, the transmitting equipment is generally designed for encoding a large number of call signals.

In the transmitter of the present invention, the call signals are encoded by the sequential modulation of a carrier wave by plural tone frequencies. Each receiver of the system includes a decoder which responds to the particular frequency values and the sequence of the modulating tone frequencies to develop a control signal for operating a signaling device in the receiver. Such a receiver is disclosed and claimed in the copending application S.N. 723,550, now Patent 3,017,631, January 16, 1962, for "Selective Paging Receiver" filed on even date herewith and assigned to the assignee of the present invention. In systems of this kind, a large number of call signals may be developed from a relatively small number of tone frequencies, and in particular, the total number of call signals is given by the expression $$M=n(n-1)(n-2)\ \dots\ (n-p+1)$$

where $n$=number of tone frequencies,
$p$=the number of tone frequencies taken at a time.

For use in paging systems, the call signal encoding transmitter must be simple to operate in the selection of call signals so that its use does not require special skills in transmitter operation. Accordingly, this invention provides automatic means for generating and timing a call signal which is manually selected by operation of simple selector switches suitably of the push-button type. For this purpose a tone frequency oscillator is arranged so that its frequency is changed by the selective switching of impedance elements in a frequency determining circuit. The transmission of the selected call signal is initiated by the operation of a single or repeat call switch and timing means are provided for determining the sequence and duration of the tone frequencies for encoding the call signal and for determining the interval between repeated call signals.

Figure 1:
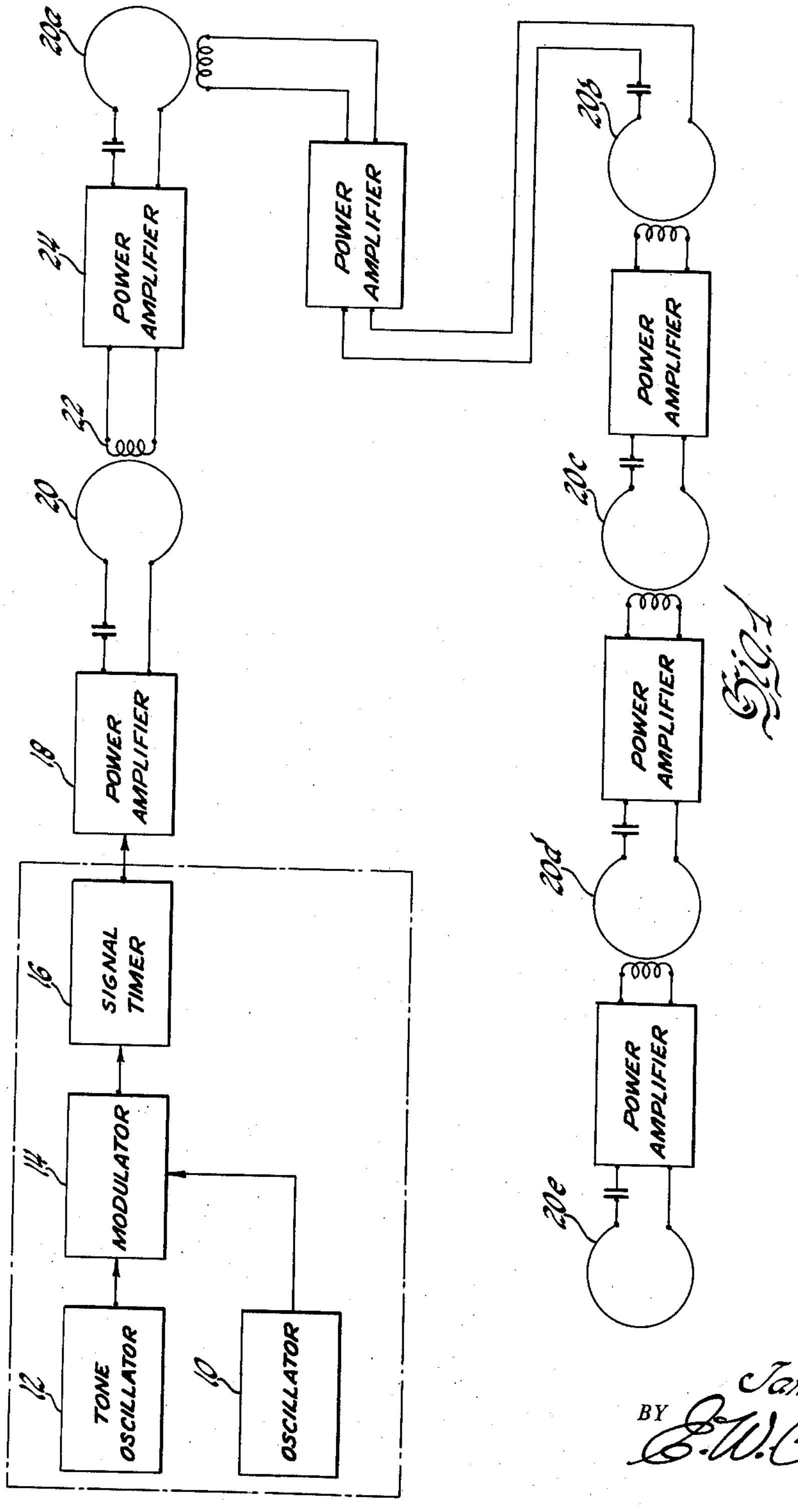
Figure 2:
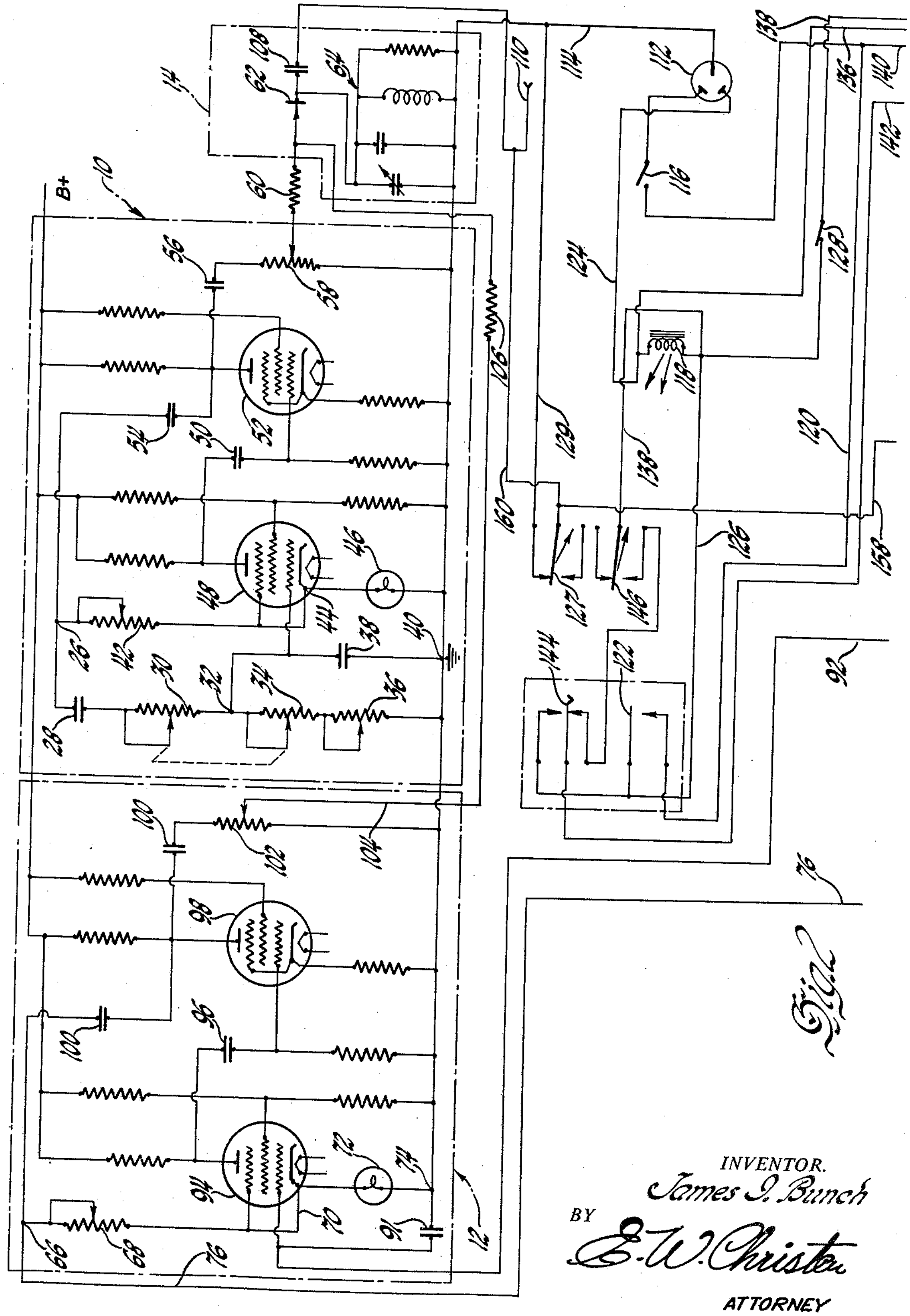
Figure 2A:
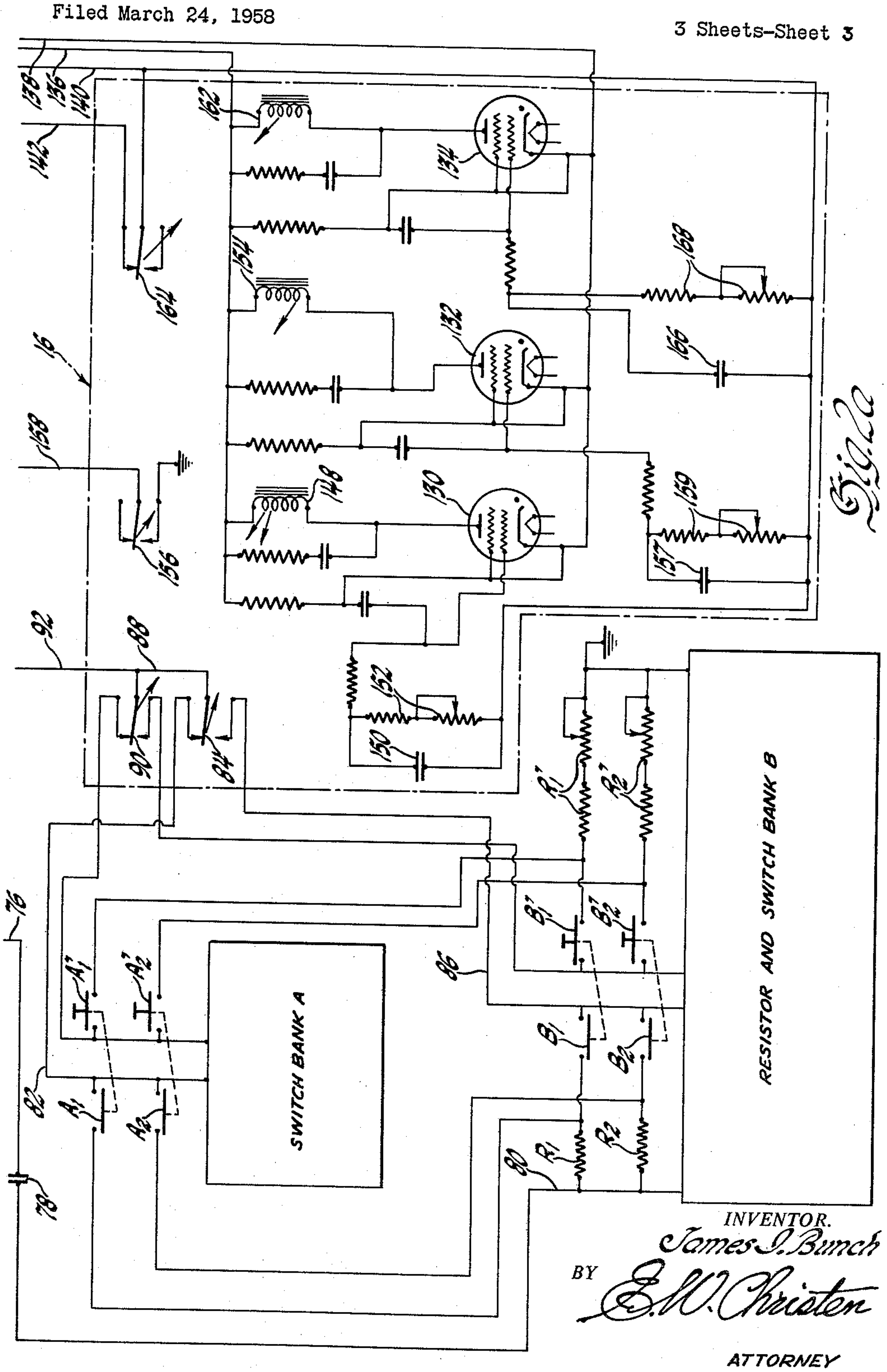

A more complete understanding of this invention may be had from the detailed description which follows taken with the accompanying drawings in which:

FIGURE 1 is a block diagram of the call signal encoding transmitter;

FIGURES 2 and 2*a*, taken together, represent a schematic diagram of certain stages of the transmitter.

Referring now to the drawings, there is shown an illustrative embodiment of the invention in a call signal encoding transmitter especially adapted for use in a paging system. As shown in FIGURE 1, the transmitter comprises a radio frequency oscillator 10 for generating a carrier wave and a tone frequency oscillator 12 for generating a plurality of tone frequencies which may be selected two at a time for successive modulation of the carrier wave by a modulator 14. Transmission of the modulated carrier wave is controlled by a signal timer 16 which determines the duration of each tone frequency and the interval between successive call signals. The call signals thus encoded are supplied through a power amplifier 18 to a transmitting antenna 20. The antenna 20 takes the form of a single loop of wire disposed generally in a plane over the area of receiver operation and is designed to provide coupling with the receiver antennas by its induction field rather than its radiation field. The system is especially adapted for use within buildings, such as manufacturing plants, office buildings and hospitals, and an entire floor of the building may be covered by a single antenna while the radiated field strength is held to a minimum. To provide coverage of additional areas by the same transmitter, such as adjacent floors of the same building or different buildings, the transmitted signal is coupled from the antenna 20 by an inductive coupling 22 through a power amplifier 24 to an additional antenna 20*a*. As many successive antennas 20*b*, 20*c*, 20*d* and 20*e* as desired are cascaded in the same manner.

In a typical embodiment of the transmitter, the radio frequency oscillator 10 generates a carrier wave frequency of 60 kilocycles per second. The tone frequency oscillator 12 generates twenty different tone frequencies ranging from 190 cycles to 600 cycles at intervals of 20 cycles. A call signal is encoded by taking two different tone frequencies at a time and, accordingly, a total of 380 different call signals or channels are available.

Referring now to FIGURES 2 and 2*a*, the circuits of the radio frequency oscillator 10, tone frequency oscillator 12 together with the modulator 14 and the timer 16 will be described in detail. The radio frequency oscillator 10 is a Wien bridge type oscillator circuit in which the first frequency determining arm of the bridge extends from the bridge input terminal 26 to the output terminal 32 through the condenser 28 and the resistor 30. The second frequency determining arm extends from output terminal 32 through the series resistors 34 and 36 and the parallel condenser 38 to the other bridge input terminal 40 which is connected to ground. One resistive arm of the bridge extends from the input terminal 26 through the resistor 42 to the output terminal 44 from which the other resistive arm extends through a positive temperature coefficient resistor, such as a tungsten filament lamp 46, to the input terminal 40 of the bridge. The output terminals 32 and 44 of the bridge are connected respectively to the grid and cathode of the amplifier 48, the output of which is applied from the plate, through the coupling condenser 50, to the grid of an amplifier 52. The output voltage from the amplifier 52, taken from plate to ground, is applied across the input terminals 26 and 40 of the bridge through the coupling condenser 54. This oscillator operates with the bridge unbalanced to provide a feedback voltage to sustain oscillations in the amplifiers 48 and 52. Sufficient voltage amplification is provided to establish a net gain of unity and the amplification is limited without distortion by the positive temperature coefficient resistor 46. This resistor has a thermal time constant which is long compared with a cycle of the oscillator frequency and thus acts as a linear resistor within each cycle. However, as the oscillations build up the resistance increases and the negative feedback in the cathode to grid circuit of the amplifier 48 is increased to limit the amplification thereof to the required value. The frequency of oscillation varies as the product of the resistance values in the first and second frequency determining arms of the bridge.

The output voltage from the oscillator 10 is taken from the plate of the amplifier 52 and is applied across the coupling condenser 56 and the potentiometer resistor 58 from which it is applied to the modulator 14 through the resistor 60. The modulator 14 is a square law modulator having a rectifier such as a germanium diode 62 serially connected with a parallel resonant circuit 64.

The resonant circuit 64 is tuned to the frequency of the carrier wave and is loaded with a parallel resistor to obtain sufficient bandwidth to include the side band frequencies.

The tone oscillator 12 is a Wien bridge type oscillator circuit in which one resistive arm of the bridge extends from an input terminal 66 through resistor 68 to an output terminal 70. The other resistive arm of the bridge extends from the output terminal 70 through the positive temperature coefficient resistor 72, such as a tungsten filament lamp, to the other input terminal 74 which is connected to ground. The bridge circuit is completed by a pair of frequency determining arms connected across the input terminals 66 and 74 and which include selectible resistance values for determining the frequency of oscillation. The first frequency determining arm extends from the input terminal 66 through the conductor 76 and condenser 78 to the common terminal 80 of a plurality of resistors $R_1$, $R_2$, etc. The other terminal of resistor $R_1$ is connectible through a selector switch $A_1$ of a switch band A and thence through conductor 82 to one fixed contact of a relay actuated sequence switch 84. Alternatively, the other terminal of resistor $R_1$ is connectible through selector switch $B_1$ of switch bank B and thence through conductor 86 to a second fixed contact of the sequence switch 84. Similarly, the resistor $R_2$ is connectible in the first frequency determining arm of the bridge through the selector switch $A_2$ and conductor 82 to the first fixed contact of sequence switch 84 and alternatively through the selector switch $B_2$ through the conductor 86 to the second fixed contact of the sequence switch 84. In a like manner, other selectible resistors are connectible through the switch bands A and B. The movable contact of the sequence switch 84 is connected to the output terminal 88 of the bridge from which extends the remaining frequency determining arm through the movable contact of a sequence switch 90 to one fixed contact thereof through selector switch $A_1'$ or the other fixed contact thereof through selector switch $B_1'$ and thence through resistor $R_1'$ to the other input terminal 74 through ground. Similarly, the second frequency determining arm extending between output terminal 88 and input terminal 74 includes condenser 91 and a parallel resistive branch connectible through sequence switch 90 and alternately through selector switches $A_2'$ or $B_2'$ and resistor $R_2'$ to the input terminal 74 through ground. In a like manner, the second frequency determining arm may be formed of other selectible resistors through switch banks A and B. Those selector switches in switch bank A having the same subscripts e.g. $A_1$ and $A_1'$ are ganged together for actuation by a common push-button and the same arrangement is used in switch bank B.

The output terminal 70 and the output terminal 88, through conductor 92, are connected respectively to the cathode and grid of the amplifier 94. The output voltage of this amplifier is applied through coupling condenser 96 to the grid of amplifier 98. The amplifier 98 develops an output voltage which is coupled from its plate through condenser 100 to the input terminal 66 of the bridge to supply the necessary feedback voltage to sustain oscillations. In the same manner, as described with reference to oscillator 10, the positive temperature coefficient resistor 72 limits the voltage amplification without distortion. The frequency of oscillation of the oscillator 12 is determined by the product of the resistance values in the first and second frequency determining arms and accordingly may be selected by operation of the selector switches of switch banks A and B. When two different frequencies of oscillation are selected by the actuation of one selector switch in switch bank A and one selector switch in switch bank B, the sequence of occurrence of these two frequencies is determined by the sequence switches 84 and 90 which are actuated by the signal timer 16 in a manner to be described subsequently. The output voltage from the oscillator 12 is derived from the plate of the amplifier 98 and applied across a coupling condenser 100 and a potentiometer resistor 102 and thence through conductor 104 and resistor 106 to the diode 62 of the modulator 14.

Thus the carrier wave is modulated by the selected tone frequencies and the modulator output voltage is coupled through the condenser 108 to the signal output terminal 110 for application to the power amplifier 18 under the control of the signal timer 16.

The signal timer 16 is suitably energized from the commercial power lines through connector 112 having one terminal connected to ground through conductor 114. Across the remaining terminals through a power switch 116, a control relay 118 is connected through conductor 120, a call switch 122, which will be termed a "single call" switch, and conductors 124 and 126. The control relay actuates a signal grounding switch 127 which connects the signal output terminal 110 to ground through conductors 160 and 129. A holding circuit for control relay 118 extends across call switch 122 through conductors 120 and 140 to timer switch 164 and thence through conductor 142, a "repeat call" switch 144 and holding switch 146. The plate to cathode circuits of the timer stages 130, 132 and 134 are connected across the control relay 118 through the timer on-off switch 128 and conductors 136 and 138. The grid to cathode circuits of the timer stages are energized directly through the power switch 116, conductor 140 and conductor 138.

The timer stage 130 is a conventional thyratron time delay circuit and includes a relay 148 in the plate circuit which actuates the sequence switches 84 and 90. The grid circuit includes a condenser 150 which is initially charged, by the grid to cathode current, to a voltage sufficient to hold the thyratron non-conductive. It remains non-conductive after closing the power switch 116, with the timer on-off switch 128 closed, until the voltage across the condenser 150 discharges to a lower value through resistor 152 and the time delay interval is determined by the time constant of the discharge circuit. Similarly, the timer stage 132 includes a relay 154 in the plate circuit and a condenser 157 and resistor 159 in the grid circuit for establishing a time delay interval. The relay 154 actuates a signal grounding switch 156 which connects the signal output terminal 110 to ground through conductors 158 and 160 to terminate transmission of the modulated carrier wave. The timer stage 134 includes a relay 162 for actuating the timer switch 164 and includes condenser 166 and resistor 168 for establishing its time delay interval.

In operation, let it be assumed that the transmitter circuits are properly energized and it is desired to transmit a call signal encoded by modulation of the carrier wave with a 190 cycle tone frequency followed by a 210 cycle tone frequency. In the typical example, previously mentioned, the carrier wave frequency is 60 kilocycles per second and the tone frequencies range from 190 cycles to 600 cycles at intervals of 20 cycles to provide 20 different tone frequencies. In this arrangement, the resistors $R_1$ and $R_1'$ in the frequency determining circuits of the tone frequency oscillator provide an oscillator frequency of 190 cycles and the resistors $R_2$ and $R_2'$ provide an oscillator frequency of 210 cycles. Accordingly, for the desired call signal, the operator simply actuates the switches $A_1$ and $A_1'$ by the common push-button actuator and the selector switches $B_2$ and $B_2'$ by the common push-button switch actuator. If it is desired to transmit the call signal once only then transmission is initiated by actuation of the "single call" switch 122. This energizes the control relay 118 which in turn actuates holding switch 146 to complete the holding circuit for the control relay and at the same time the signal grounding switch 127 is opened. Therefore, transmission is initiated with the carrier wave modulated first by the tone frequency of 190 cycles as determined by the resistors $R_1$ and $R_1'$ since the sequence switches 84 and 90 remain in the normal positions, as indicated, to connect these resistors in the frequency determining arms of the tone frequency oscillator. Simultaneously with the energization of the control relay 118, the cathode circuits of the timer stages 130, 132 and 134 are completed and the timer cycling commences. The timer stage 130, after a time delay interval of three seconds, causes energization of its relay 148. Accordingly, the sequence switches 84 and 90 are actuated to terminate the 190 cycle modulation and to initiate the 210 cycle modulation by switching the resistors $R_2$ and $R_2'$ into the frequency determining circuits of the tone oscillator. The timer stage 132, after a time delay of six seconds, causes energization of its relay 154 and the signal grounding switch 156 is closed. Thus the signal output terminal 110 is connected to ground and transmission of the carrier wave is terminated. The timer stage 134, after a time delay interval of nine seconds, causes energization of its relay 162 and the timer switch 164 is opened. This opens the holding circuit for the control relay 118 and the circuits are thus restored to their normal condition ready for another cycle of operation which must be initiated by actuation of the call switch 122 or the "repeat call" switch 144. If it is desired to repetitively transmit the call signal the "repeat call" switch 144 is actuated and the sequence of operation just described is initiated. Closing the repeat call switch 144 against its upper contact completes a holding circuit for the control relay 118 which extends through the timer switch 164. Thus when the timer cycle is completed and the timer stage 134 energizes relay 162 the timer switch 164 is opened and the control relay 118 is deenergized. However, the deenergization of control relay 118 interrupts the cathode circuits of the timer stages which are thereby restored to their normal condition. Since the "repeat call" switch 144 remains closed, the operating cycle is once again initiated to repeatedly transmit the call signal until the "repeat call" switch 144 is opened.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

I claim:

1. A call signal encoding transmitter comprising a first oscillator for generating a carrier wave voltage, a second oscillator for generating a signal voltage of selectible frequency, a mixer interconnecting said oscillators for modulating the carrier wave voltage with the signal voltage of selected frequency, said second oscillator being of the type wherein the frequency is determined by the value of an impedance element in a two terminal frequency determining circuit thereof, the second oscillator including plural impedance elements of different values and having a common terminal forming one terminal of said frequency determining circuit, a sequence switch having a movable contact forming the other terminal of said frequency determining circuit and having a first and second fixed contact with the movable contact normally closed against the first fixed contact, a different pair of selector switches corresponding to each impedance element, the selector switches of each pair being connected between the remaining terminal of the corresponding impedance element and the respective first and second fixed contacts of said sequence switch whereby two different frequencies of said second oscillator may be selected by operation of any first and any second selector switch, timing means, a call switch for energizing the timing means, the timing means including a first time delay relay connected with said sequence switch for displacing the movable contact from the first fixed contact to the second fixed contact a predetermined time interval after energization of the timing means, and a second time delay relay having contacts connected with the output circuit of said mixer for terminating transmission of the modulated carrier wave after a predetermined time interval.

2. A call signal encoding transmitter comprising a first oscillator for generating a carrier wave voltage, a second oscillator for generating a signal voltage of selectible frequency, a mixer interconnecting said oscillators for modulating the carrier wave voltage with the signal voltage of selected frequency, said second oscillator being of the type wherein the frequency is determined by the value of an impedance element in a two terminal frequency determining circuit thereof, the second oscillator including plural impedance elements of different values and having a common terminal forming one terminal of said frequency determining circuit, a sequence switch having a movable contact forming the other terminal of said frequency determining circuit and having a first and second fixed contact with the movable contact normally closed against the first fixed contact, a different pair of selector switches corresponding to each impedance element, the selector switches of each pair being connected between the remaining terminal of the corresponding impedance element and the respective first and second fixed contacts of said sequence switch whereby two different frequencies of said second oscillator may be selected by operation of any first and any second selector switch, normally closed and normally open signal grounding switches connected across the output terminals of the modulator, timing means including an energizing switch therefor, a control relay connected with the normally closed grounding switch and connected with the energizing switch, a call switch for energizing the control relay, the timing means including a first time delay relay connected with said sequence switch for displacing the movable contact from the first fixed contact to the second fixed contact a predetermined time interval after energization of the timing means, and a second time delay relay connected with the normally open signal grounding switch for terminating transmission of the modulated carrier wave after a predetermined time interval.

3. A call signal encoding transmitter comprising a first oscillator for generating a carrier wave voltage, a second oscillator for generating a signal voltage of selectible frequency, a mixer interconnecting said oscillators for modulating the carrier wave voltage with the signal voltage of selected frequency, said second oscillator being of the type wherein the frequency is determined by the value of an impedance element in a two terminal frequency determining circuit thereof, the second oscillator including plural impedance elements of different values and having a common terminal forming one terminal of said frequency determining circuit, a sequence switch having a movable contact forming the other terminal of said frequency determining circuit and having a first and second fixed contact with the movable contact normally closed against the first fixed contact, a different pair of selector switches corresponding to each impedance element, the selector switches of each pair being connected between the remaining terminal of the corresponding impedance element and the respective first and second fixed contacts of said sequence switch whereby two different frequencies of said second oscillator may be selected by operation of any first and any second selector switch, normally closed and normally open signal grounding switches connected across the output terminals of the modulator, timing means including an energizing switch therefor, a control relay connected with the normally closed grounding switch and connected with the energizing switch, a "single call" switch for energizing the control relay when momentarily closed, a holding circuit for the control relay including a normally open holding switch actuated by the control relay and including a normally closed holding switch, the timing means including a first time delay relay connected with said sequence switch for displacing the movable contact from the first fixed contact to the second fixed contact a predetermined time interval after energization of the timing means, a second time delay relay connected with the normally open signal grounding switch for terminating transmission of the modulated carrier wave after a predetermined time interval, and a third time delay relay connected with the normally closed holding switch for deenergizing the control relay after a further predetermined time interval.

4. A call signal encoding transmitter comprising a first oscillator for generating a carrier wave voltage, a second oscillator for generating a signal voltage of selectible frequency, a mixer interconnecting said oscillators for modulating the carrier wave voltage with the signal voltage of selected frequency, said second oscillator being of the type wherein the frequency is determined by the value of an impedance element in a two terminal frequency determining circuit thereof, the second oscillator including plural impedance elements of different values and having a common terminal forming one terminal of said frequency determining circuit, a sequence switch having a movable contact forming the other terminal of said frequency determining circuit and having a first and second fixed contact with the movable contact normally closed against the first fixed contact, a different pair of selector switches corresponding to each impedance element, the selector switches of each pair being connected between the remaining terminal of the corresponding impedance element and the respective first and second fixed contacts of said sequence switch whereby two different frequencies of said second oscillator may be selected by operation of any first and any second selector switch, normally closed and normally open signal grounding switches connected across the output terminals of the modulator, timing means including an energizing switch therefor, a control relay connected with the normally closed grounding switch and connected with the energizing switch, "a repeat call" switch for energizing the control relay, a normally closed timing switch serially connected with the "repeat call" switch, the timing means including a first time delay relay connected with said sequence switch for displacing the movable contact from the first fixed contact to the second fixed contact a predetermined time interval after energization of the timing means, and a second time delay relay connected with the normally open signal grounding switch for terminating transmission of the modulated carrier wave after a predetermined time interval and a third time delay relay connected with the normally closed timing switch for deenergizing the control relay and thereby deenergizing the timing means after a further predetermined time interval whereby the timing switch is reclosed and the timing cycle is repeated.

References Cited in the file of this patent

UNITED STATES PATENTS

| | | |
|---|---|---|
| 1,476,003 | Martin | Dec. 4, 1923 |
| 2,369,662 | Deloraine et al. | Feb. 20, 1945 |
| 2,395,693 | Sorensen | Feb. 26, 1946 |
| 2,523,315 | Mayle | Sept. 26, 1950 |
| 2,553,910 | Gaffrey et al. | May 22, 1951 |
| 2,675,544 | Trimble | Apr. 13, 1954 |
| 2,701,279 | Lovell et al. | Feb. 1, 1955 |